United States Patent [19]

Amey et al.

[11] Patent Number: 5,800,923
[45] Date of Patent: Sep. 1, 1998

[54] ACID COMPOSITION COMPRISING A COATED POLYVALENT CARBOXYLIC ACID SOLID PARTICLE AND A POWDER COATING COMPRISING THE SAME

[75] Inventors: Ronald Lee Amey, Wilmington; George Alan Schurr, Newark, both of Del.

[73] Assignee: E. I. du Pont de Nemours and Company, Wilmington, Del.

[21] Appl. No.: 700,953

[22] Filed: Aug. 21, 1996

Related U.S. Application Data

[60] Provisional application No. 60/003,557, Aug. 29, 1995.
[51] Int. Cl.$^6$ .................................................. B32B 5/16
[52] U.S. Cl. .......................... 428/407; 525/327.3; 525/386
[58] Field of Search .................... 428/407; 525/327.3, 525/386

[56] References Cited

U.S. PATENT DOCUMENTS

| | | | |
|---|---|---|---|
| 4,351,914 | 9/1982 | Khanna | 523/448 |
| 4,499,239 | 2/1985 | Murakami et al. | 525/111 |
| 4,808,639 | 2/1989 | Chernack | 523/211 |
| 5,010,119 | 4/1991 | McElrath, Jr. et al. | 428/407 |
| 5,270,416 | 12/1993 | Toman et al. | 526/773 |

FOREIGN PATENT DOCUMENTS

| | | |
|---|---|---|
| 044 030 | 1/1982 | European Pat. Off. . |
| 0 415 326 | 3/1991 | European Pat. Off. . |
| 653 466 | 5/1995 | European Pat. Off. . |
| 672 707 | 9/1995 | European Pat. Off. . |
| 35 29 839 | 2/1987 | Germany . |
| 48-24264 | 7/1973 | Japan . |
| 58-4746 | 1/1983 | Japan . |
| 58-25351 | 5/1983 | Japan . |
| 58-25352 | 5/1983 | Japan . |
| 62-18152 | 4/1987 | Japan . |
| 3-182520 | 8/1991 | Japan . |
| 3-292378 | 12/1991 | Japan . |
| WO 91/12293 | 8/1991 | WIPO . |

*Primary Examiner*—Bernard Lipman

[57] ABSTRACT

An acid composition comprises a polyvalent carboxylic acid solid particle coated with a polymer. The acid composition may function as a cross-linking agent in a powder coating, which also includes a resin. The resin and the polymer of the acid composition may be the same, or they may be different. The mean particle size of the coated acid solid particles is in the range of 0.5 to 50 micrometers. When used in a powder coating, such coated solid particles reduce or eliminate sublimation of the acid cross-linking agent from the powder coating during the curing step. In addition, these coated solid particles increase the storage shelf-life of the powder coating in which they are used. Such coated particles also improve the flow characteristics of the powder coating during curing thereof and the gloss and surface quality of the final cured coating.

17 Claims, 2 Drawing Sheets

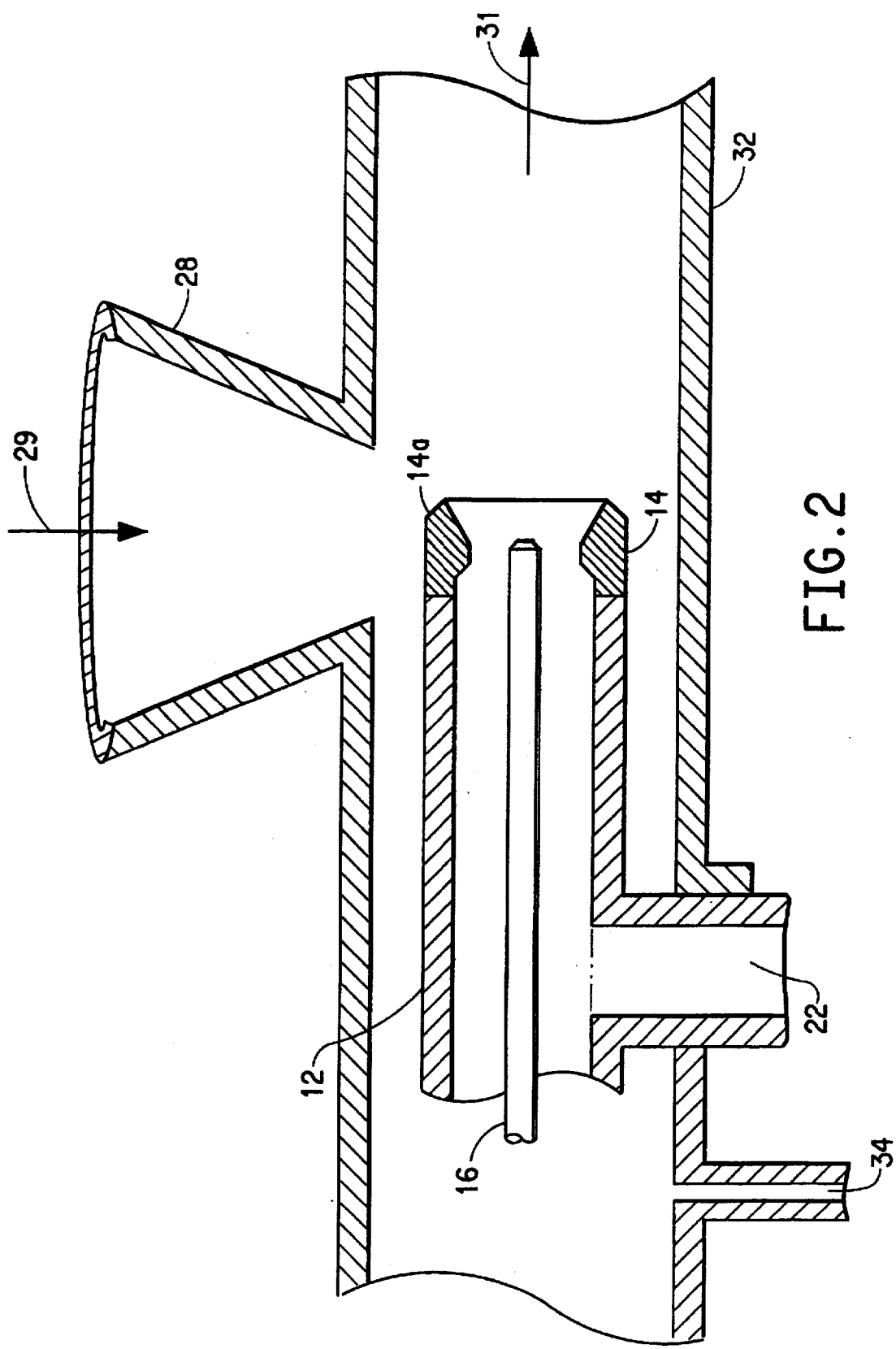

ACID COMPOSITION COMPRISING A COATED POLYVALENT CARBOXYLIC ACID SOLID PARTICLE AND A POWDER COATING COMPRISING THE SAME

This is a nonprovisional application of prior copending provisional application Ser. No. 60/003,557 filed Aug. 25, 1995.

BACKGROUND OF THE INVENTION

1. Field of the Invention

This invention relates to an acid composition comprising a coated polyvalent carboxylic acid solid particle. In addition, this invention relates to a powder coating comprising an acid composition and a resin, in which the acid composition functions as a cross-linking agent.

2. Description of the Related Art

Powder coatings are finely pulverized polymeric compositions in the form of dry, free-flowing fine powder which melts and flows at elevated temperatures to produce a smooth coated surface when applied to a substrate. Protective surface coatings based on powder coatings are particularly useful in view of environmental compliance in that powder paints ordinarily do not contain organic solvents or emit organic compounds upon baking or heat curing.

Polyvalent carboxylic acids have been used as cross-linking agents in powder coatings. See, e.g., U.S. Pat. Nos. 4,351,914, 4,499,239 and 5,270,416. Also see Japanese Patent Publications 58-4746, 58-25351 and 58-25352. However, the acids in these patents and publications are not coated. Sublimation of uncoated acids from powder coatings during curing results in surface defects in the cured coating, localized under-cured (i.e., poorly cured) portions of the coating and higher costs associated with using higher than required levels of uncoated acid to compensate for the uncoated acid lost to sublimation. In addition, powder coatings with uncoated acids have a relatively short shelf life. Moreover, such powder coatings may have poor flow characteristics during curing due to relatively quick localized curing and subsequent viscosity increase of the powder coating by the uncoated acid.

In addition, coated cross-linking agents are known in the art. A microencapsulated curing agent and an adhesive composition comprising this curing agent is disclosed in Japanese Patent Publication 3292378, published on Dec. 24, 1991. A microencapsulated curing agent for an epoxy resin is also disclosed in Japanese Patent Publication 3182520, published on Aug. 8, 1991. A microencapsulated peroxide cross-linking agent for a liquid adhesive is disclosed in U.S. Pat. No. 4,809,639. However, none of these cross-linking agents are suitable for use with a powder coating resin such as glycidyl methacrylate.

It is also known how to coat an organic acid used in a food product as disclosed in EP 0 415 326A1, JP 55088666 and JP 48024264. However, none of these publications deals with coating an acid for use in a powder coating.

Therefore, there exists a need to produce a powder coating in which sublimation of acid particles therein is eliminated or at least substantially reduced. Also, it would be desirable to produce a powder coating which has an improved shelf-life over powder coatings of the prior art. Moreover, it would be desirable to produce a cured powder coating which has a better surface quality—i.e., fewer defects, better gloss, than the surface quality exhibited by powder coatings of the prior art. In addition, there exists a need to produce a powder coating which has better flow properties during curing and better uniformity, after it has been cured, than the flow properties and uniformity exhibited by powder coatings of the prior art.

SUMMARY OF THE INVENTION

The present invention solves the problems of the prior art by providing very small coated acid particles, in particular which are in the range of 0.5 to 50 micrometers (μ). When used as a cross-linking agent in a powder coating, such coated acid particles reduce or eliminate sublimation of the acid particles from the powder coating during the curing step. In addition, these coated acid particles increase the storage shelf life of the powder coating in which they are used. Such coated particles also improve the flow characteristics of the powder coating during curing thereof and improve the gloss and surface quality of the final cured coating.

To achieve the objects and in accordance with purposes of the invention, as embodied and broadly described herein, there is provided an acid composition comprising a polyvalent carboxylic acid solid particle coated with a coating material comprising a polymer, wherein the polyvalent carboxylic acid solid particle has the following structural formula:

$[HO_2C]_m—R—[CO_2H]_n$ where R is selected from the group consisting of: (a) a linear alkylene group of 1 to 24 carbon atoms, (b) a branched alkylene group of of 1 to 24 carbon atoms, (c) a cyclic alkylene group of 3 to 10 carbon atoms, (d) an alkyl-substituted cyclic alkylene group of 3 to 10 carbon atoms, (e) an aromatic group, (f) an alkyl-substituted aromatic group, (g) an anhydride group having a structure —[R'—CO—O—CO—R"]$_x$, wherein R' and R" are independently selected from (a), (b), (c), (d), (e) and (f), x=1–20, and m+n=2, 3 or 4.

Further in accordance with the present invention, there is provided a powder coating comprising: a resin; and an acid composition comprising a solid dicarboxylic acid particle coated with a coating material comprising a polymer, wherein the solid dicarboxylic acid particle has the following structural formula:

$[HO_2C]_m—R—[CO_2H]_n$ where R is selected from the group consisting of: (a) a linear alkylene group of 1 to 24 carbon atoms, (b) a branched alkylene group of of 1 to 24 carbon atoms, (c) a cyclic alkylene group of 3 to 10 carbon atoms, (d) an alkyl-substituted cyclic alkylene group of 3 to 10 carbon atoms, (e) an aromatic group, (f) an alkyl-substituted aromatic group, (g) an anhydride group having a structure —[R'—CO—O—CO—R"]$_x$, wherein R' and R" are independently selected from (a), (b), (c), (d), (e) and (f), x=1–20, and m+n=2, 3 or 4.

BRIEF DESCRIPTION OF THE DRAWINGS

FIG. 2 is a cut-away, expanded, cross-sectional view of a portion of the apparatus shown in FIG. 1.

DETAILED DESCRIPTION OF THE PREFERRED EMBODIMENTS

Figure 1:
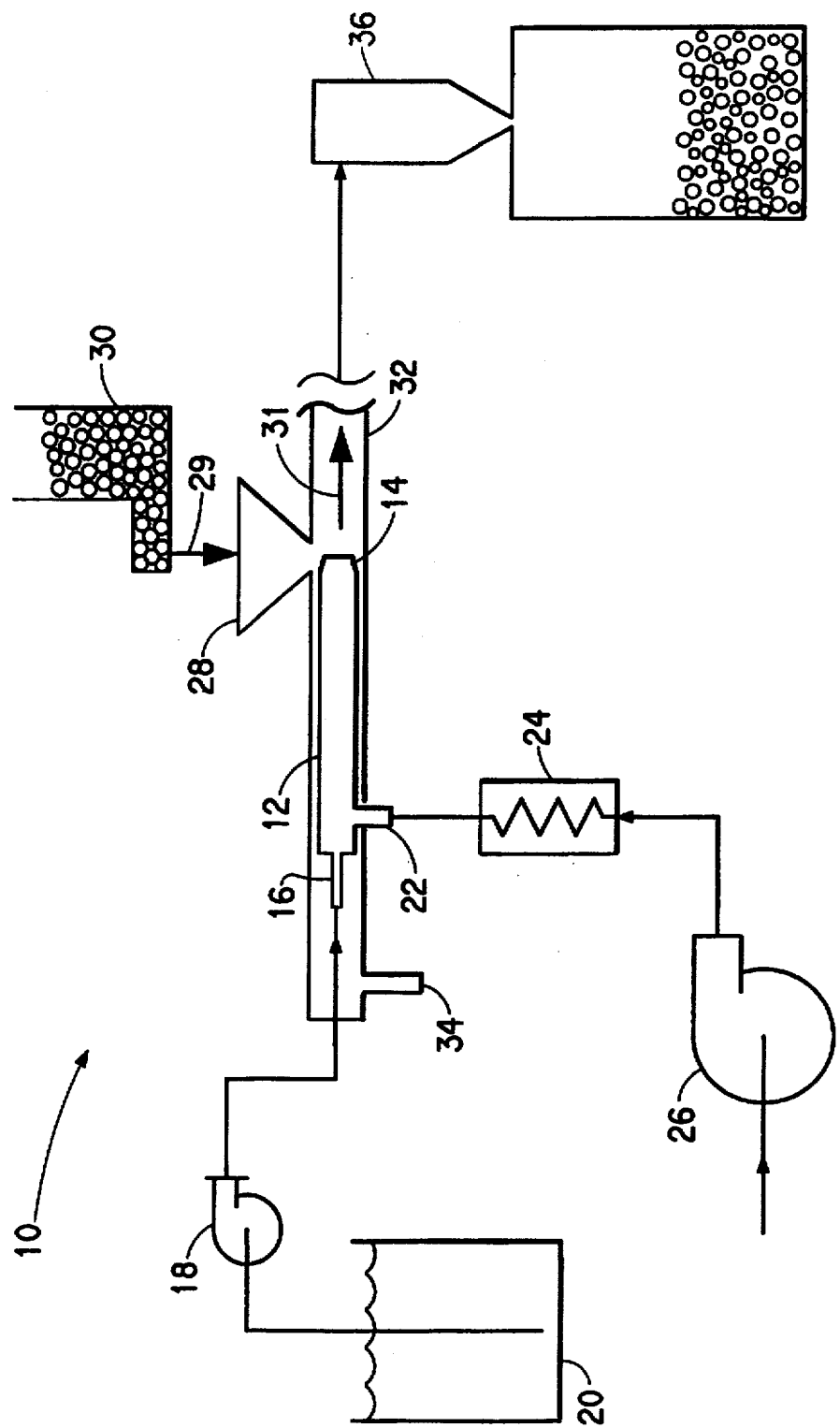
FIG. 1 is a schematic diagram of a portion of the apparatus in accordance with the present invention.

In accordance with a first embodiment of the present invention, there is provided an acid composition comprising a polyvalent carboxylic acid solid particle coated with a coating material comprising a polymer. The polyvalent carboxylic acid solid particle has the following structural formula:

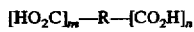

where R is selected from the group consisting of: (a) a linear alkylene group of 1 to 24 carbon atoms, (b) a branched alkylene group of of 1 to 24 carbon atoms, (c) a cyclic alkylene group of 3 to 10 carbon atoms, (d) an alkyl-substituted cyclic alkylene group of 3 to 10 carbon atoms, (e) an aromatic group, (f) an alkyl-substituted aromatic group, (g) an anhydride group having a structure —[R'—CO—O—CO—R"]$_x$, wherein R' and R" are independently selected from (a), (b), (c), (d), (e) and (f). In addition, x=1–20, and m+n=either 2, 3 or 4.

The polyvalent carboxylic acid solid particle may be a dicarboxylic acid. The dicarboxylic acid may be either a linear aliphatic acid, a branched aliphatic acid, a cycloaliphatic acid, an alkyl-substituted cycloaliphatic acid, an aromatic acid, an alkyl-substituted aromatic acid or a carboxylic-group terminated anhydride derived from a linear aliphatic acid, a branched aliphatic acid, a cycloaliphatic acid, an alkyl-substituted cycloaliphatic acid, an aromatic acid or an alkyl-substituted aromatic acid. More specifically, the polyvalent carboxylic acid solid particle may be, but is not limited to, any of the following: aliphatic acid, and more specifically, aliphatic dibasic acid (dicarboxylic acid), such as succinic acid, glutaric acid, adipic acid, pimelic acid, sebacic acid, azelaic acid, dodecanedioic acid, tetradecanedioic acid, hexadecanedioic acid, eicosanodioic acid and tetraeicosandioic acid; aliphatic dibasic acid anhydrides, such as polyazelaic polyanhydride, polysebacic polyanhydride, and polydodecandioic polyanhydride, etc.; aromatic carboxylic acids or their anhydrides, such as phthalic acid, isophthalic acid, terephthalic acid, phthalic anhydride, trimellitic acid, trimellitic acid anhydride and pyromellitic acid anhydride, etc.; aliphatic cyclic carboxylic acids or their anhydrides, such as cyclohexanedicarboxylic acid, methylcyclohexanedicarboxylic acid, tetrahydrophthalic acid, and tetrahydrophthalic acid anhydride. The above polyvalent carboxylic acids can be used singly or as a mixture of two or more of them together, as well as of other components.

The polymer used for the coating material may be either a homopolymer or a co-polymer. Polymers suitable for use as the coating material with the present invention include, but are not limited to, polyesters, polyamides, epoxy polymers, polyurethanes and glycidyl-group-containing acrylic polymers produced by the co-polymerization of a glycidyl-group containing monomer and an unsaturated ethylenic monomer. These polymers may be used alone or in a mixture comprising two or more of them, as well as of other components.

Examples of the glycidyl-group-containing monomer include glycidyl acrylate, methylglycidyl acrylate, glycidyl methacrylate, methylglycidyl methacrylate, allyl gylcidyl ether, allyl methylglycidyl ehter, methallyl glycidyl ether, methallyl methylglycidyl ether, N-glycidyl acrylamide, glycidyl vinylsulfonate, etc. These monomers can be used alone or in a mixture comprising two or more of them, as well as of other components. Examples of unsaturated ethylenic monomer include acrylate esters, methacrylate esters, dialkyl fumarates, dialkyl itaconates, styrene, vinyltoluene, alpha-methylstyrene, acrylonitrile, methacrylonitrile, acrylamide, methacrylamide, methylolacrylamide, alkoxymethylolacrylamide, vinyloxazoline, vinyl acetate, vinyl propionate, lauryl vinyl ether, etc. The acrylate and methacrylate esters include, for example, methyl acrylate, ethyl acrylate, n-propyl acrylate, isopropyl acrylate, n-butyl acrylate, isobutyl acrylate, tert-butyl acrylate, cyclohexyl acrylate, 2-ethylhexyl acrylate, octyl acrylate, 2-ethyloctyl acrylate, dodecyl acrylate, benzyl acrylate, phenyl acrylate, 2-hydroxyethyl acrylate, 2-hydroxylpropyl acrylate, methyl methacrylate, ethyl methacrylate, n-propyl methacrylate, isopropyl methacrylate, n-butyl methacrylate, isobutyl methacrylate, ter-butyl methacrylate, cyclohexyl methacrylate, 2-ethylhexyl methacrylate, octyl methacrylate, 2-ethyloctyl methacrylate, dodecyl methacrylate, benzyl methacrylate, phenyl methacrylate, 2-hydroxyethyl methacrylate, 2-hydroxylpropyl methacrylate, etc. The above acrylate esters, methacrylate esters, and other unsaturated ethylenic monomers can be used alone or in a mixture comprising two or more of them, as well as of other components.

In a preferred implementation of the first embodiment of the present invention, the acid is a linear aliphatic dicarboxylic acid, and in particular, a dodecanedioic acid, and the polymer is a co-polymer of glycidyl methacrylate, butyl methacrylate, methyl methacrylate and styrene.

The mean particle size of the acid composition, i.e., the particle with the the coating, ranges from about 0.5 to about 50 micrometers (μ), and preferably in the range of 0.5 to 30 micrometers (μ). In accordance with the present invention, the weight percentage of the coating to the total weight of the solid particle ranges from about 2% to about 15%.

In accordance with a second embodiment of the present invention, there is provided a powder coating. The powder coating comprises a resin and an acid composition comprising a polyvalent carboxylic acid solid particle coated with a polymer as described above in the first embodiment. In this embodiment, the acid composition functions as a cross-linking agent.

In the second embodiment, the carboxylic acid solid particle and the polymer are the same as described above with respect to the first embodiment. In addition, the resin may be the same material as the polymer used to coat the solid particle, or it may be a different material. Thus, the resin may be either a co-polymer or a homopolymer. Polymers suitable for use as either the coating material or the resin of the second embodiment include, but are not limited to, polyesters, polyamides, epoxy polymers, polyurethanes and glycidyl-group-containing acrylic polymers produced by the co-polymerization of a glycidyl-group containing monomer and an unsaturated ethylenic monomer. These polymers may be used alone or in a mixture comprising two or more of them, as well as of other components.

Examples of the glycidyl-group-containing monomer include glycidyl acrylate, methylglycidyl acrylate, glycidyl methacrylate, methylglycidyl methacrylate, allyl gylcidyl ether, allyl methylglycidyl ehter, methallyl glycidyl ether, methallyl methylglycidyl ether, N-glycidyl acrylamide, glycidyl vinylsulfonate, etc. These monomers can be used alone or in a mixture comprising two or more of them, as well as of other components. Examples of unsaturated ethylenic monomer include acrylate esters, methacrylate esters, dialkyl fumarates, dialkyl itaconates, styrene, vinyltoluene, alpha-methylstyrene, acrylonitrile, methacrylonitrile, acrylamide, methacrylamide, methylolacrylamide, alkoxymethylolacrylamide, vinyloxazoline, vinyl acetate, vinyl propionate, lauryl vinyl ether, etc. The acrylate and methacrylate esters include, for example, methyl acrylate, ethyl acrylate, n-propyl acrylate, isopropyl acrylate, n-butyl acrylate, isobutyl acrylate, tert-butyl acrylate, cyclohexyl acrylate, 2-ethylhexyl acrylate, octyl acrylate, 2-ethyloctyl acrylate, dodecyl acrylate, benzyl acrylate, phenyl acrylate, 2-hydroxyethyl acrylate, 2-hydroxylpropyl acrylate, methyl methacrylate, ethyl methacrylate, n-propyl methacrylate, isopropyl methacrylate, n-butyl methacrylate, isobutyl methacrylate, ter-butyl methacrylate, cyclohexyl methacrylate, 2-ethylhexyl methacrylate, octyl methacrylate, 2-ethyloctyl methacrylate, dodecyl methacrylate, benzyl methacrylate, phenyl methacrylate, 2-hydroxyethyl methacrylate, 2-hydroxylpropyl methacrylate, etc. The above acrylate esters, methacrylate esters, and other unsaturated ethylenic monomers can be used alone or in a mixture comprising two or more of them, as well as other components.

In a preferred version of the second embodiment, the acid is a linear aliphatic dicarboxylic acid, and in particular, a dodecanedioic acid, and the polymer is a co-polymer of glycidyl methacrylate, butyl methacrylate, methyl methacrylate and styrene.

Additives may be added to the powder coating of the second embodiment, depending on the formulation of the composition. Such additives include pigments, fillers, flow control agents, UV adsorbers, light stabilizers, etc. The additives are usually added after the first resin and the acid composition are mixed, although this sequence is not necessary. The powder coating of the second embodiment may be made by known methods—e.g., dry mixing or melt extrusion.

The acid composition as described above may be made by an apparatus and a process for coating a solid particle with a polymer as will be described below with reference to the accompanying drawings. By coating is meant adhering a layer of one substance to the surface of a solid particle, and includes encapsulation of substantially all, or all, the surface of the solid particle. It should be noted that while one pass, or cycle, of the process of the present invention completely coats, or encapsulates, the solid particle, more than one pass may be used to adhere additional polymer to the solid particle, depending on the desired thickness of the coating.

The apparatus and process as described herein may be used to make an acid composition comprising any polyvalent carboxylic acid solid particle coated with any polymer. In particular, the apparatus and process may be used to make an acid composition which has a mean particle size in the range of about 0.5 to about 50 micrometers ($\mu$), and preferably less than 30 micrometers ($\mu$). This includes the particular polyvalent carboxylic acid solid particles and the particular polymers as described above.

The apparatus and process as described hereinbelow are particularly useful for making coated acid compositions which in particular have heretofore been too small in diameter to achieve, say those having a diameter in the range of 0.5 to 50 micrometers ($\mu$), and in particular those having a diameter of less than 30 micrometers ($\mu$). Moreover, with the apparatus and the process of the present invention, the force of the gas stream may be varied so that the particles released into the zone of turbulence do not stick to each other, resulting in a composition in which there is only one individual solid particle in the core of each coating. Also, the coated solid particles are non-agglomerated, so that two or more individual particles are not stuck together by the coating. This non-agglomeration, in particular, where the coated particles have a diameter in the range of about 0.5 to 50 micrometers ($\mu$), was heretofore not possible with processes of the prior art. Thus, the size distribution of non-agglomerated, coated solid particles made by the apparatus and process of the present invention is such that a greater percentage of coated particles have a smaller diameter than could be previously achieved by processes of the prior art.

In a preferred implementation of the present invention, the polymer used as the coating material is dissolved in a liquid, i.e., the coating liquid is a solution comprising the polymer. It should be noted that the solution may comprise other components, other than the coating material. Alternatively, the polymer used as the coating material may be undissolved in a liquid, i.e., the coating liquid is a slurry comprising the polymer, where the slurry may comprise other components. Or, the polymer may be in melt form, and optionally may comprise other components, so that the coating liquid comprises the melt polymer. By melt is meant any substance at a temperature at or above it melting point, but below its boiling point.

An apparatus according to the present invention is shown generally at 10 in FIG. 1. The apparatus of the present invention comprises a first chamber, shown at 12 in FIGS. 1 and 2. A flow restrictor 14 is disposed at one end of the first chamber. The flow restrictor is typically disposed at the downstream end of the first chamber, as shown in FIGS. 1 and 2. Flow restrictor 14 has an outlet end 14a, as shown in the detailed view of FIG. 2. Although the flow restrictor is shown as a different element from the first chamber, it may be formed integrally therewith, if desired. The flow restrictor of the present invention may have various configurations, as long as it serves to restrict flow and thereby increase the pressure of the fluid passing through it. Typically, the flow restrictor of the present invention is a nozzle.

A first, or liquid, inlet line 16 as shown in FIGS. 1 and 2 is disposed in fluid communication with the first chamber for metering a liquid comprising a polymer into the chamber. Liquid inlet line 16 meters the liquid into first chamber 12 in the outlet of flow restrictor 14, and preferably in the center of the flow restrictor when viewed along the axial length thereof. The liquid is metered through liquid inlet line 16 by a metering pump 18 from a storage container 20 containing the liquid as shown in FIG. 1. It should be noted that if a polymer melt is used as a coating material, storage container 20 must be heated to a temperature above the melt temperature of the polymer in order to maintain the polymer in melt form.

The apparatus for coating a solid particle further includes a second, or gas, inlet line 22 disposed in fluid communication with the first chamber as shown in FIGS. 1 and 2. Generally, the gas inlet line should be disposed in fluid communication with the first chamber upstream of the flow restrictor. Gas inlet line 22 injects a first gas stream through the flow restrictor to create a zone of turbulence at the outlet of the flow restrictor. The turbulence subjects the coating material to shear forces that atomize the liquid comprising the polymer.

The first gas stream should have a stagnation pressure sufficient to accelerate the gas to at least one-half the velocity of sound, or greater, prior to entering the flow restrictor to ensure that a zone of turbulence of sufficient intensity will be formed at the outlet of the flow restrictor. The velocity of sound for a particular gas stream, e.g., air or nitrogen, will be dependent on the temperature of the gas stream. This is expressed by the equation for the speed of sound, c:

$$c=\sqrt{kgRT} \tag{1}$$

where:

k=ratio of specific heats for the gas g=acceleration of gravity

R=universal gas constant
T=absolute temperature of the gas Thus, the acceleration of the first gas stream is dependent on the temperature of the gas stream.

As noted above, it is the pressurized gas that causes the atomization of the liquid comprising the coating material. The pressure of the coating material in the liquid inlet line just needs to be enough to overcome the system pressure of the gas stream. It is preferable that the liquid inlet line has an extended axial length before the zone of turbulence. If the liquid inlet line is too short, the flow restrictor becomes plugged.

The apparatus of the present invention also comprises means disposed in the second inlet line and upstream of the flow restrictor for heating the first gas stream prior to injection through the flow restrictor. Preferably, the heating means comprises a heater 24 as shown in FIG. 1. Alternatively, the heating means may comprise a heat exchanger, a resistance heater, an electric heater, or any type of heating device. Heater 24 is disposed in second inlet line 22. A pump 26 as shown in FIG. 1 conveys the first gas stream through heater 24 and into first chamber 12. If a polymer melt is used as the coating material, the gas stream should be heated to a temperature at or above the melt temperature of the melt, to keep the coating material in liquid (i.e., melt) form. When using a polymer melt, it is also helpful if auxiliary heat is provided to the first inlet line which supplies the melt prior to injection, to prevent pluggage of the line.

The apparatus of the present invention further includes a hopper 28 as shown in FIGS. 1 and 2. Hopper 28 introduces a solid particle to the zone of turbulence. It is preferable that the outlet end of the flow restrictor is positioned in the first chamber beneath the hopper at the center line of the hopper. This serves to ensure that the solid particles are introduced directly into the zone of turbulence. This is important because, as noted above, the turbulence subjects the liquid comprising the polymer to shear forces that atomize the liquid. It also increases operability by providing a configuration for feeding the solid particles most easily. In addition, the shear forces disperse and mix the atomized liquid with the solid particles, which allows the particles to be coated. Hopper 28 may be fed directly from a storage container 30 as shown by arrow 29 in FIG. 1. Typically, the hopper of the present invention is open to the atmosphere. Should the polymer be a melt, it is preferred that the solid particles are at ambient temperature because this facilitates solidification of the polymer melt after the melt, which is initially at a higher temperature, coats the solid particle in the zone of turbulence. The hopper of the present invention may include a metering device for accurately metering the particles at a particular ratio to the liquid feed from liquid inlet line 16 into the zone of turbulence. This metering establishes the level of coating on the solid particle.

The apparatus of the present invention may further include a second chamber 32 surrounding the first chamber as shown in FIGS. 1 and 2. In addition, the second chamber encloses the zone of turbulence. Second chamber 32 has an inlet 34 for introducing a second gas stream into the second chamber. The inlet of the second chamber is preferably positioned at or near the upstream end of second chamber 32. The outlet of second chamber 32 is connected to a collection container, such as that shown at 36 in FIG. 1. The second gas stream cools and conveys the coated solid particles toward the collection container as illustrated by arrow 31 in FIG. 2. In particular, when a solution or slurry is used, the polymer which is either dissolved or undissolved in the liquid cools between the zone of turbulence and container so that by the time the particle reaches the container, a solid polymer coating is formed on the particle. Should a polymer melt be used as the coating material, the melt cools between the zone of turbulence so that by the time the particle reaches the container, a solid polymer coating is formed on the particle. The first gas stream, as well as the second gas stream, are vented through the top of collection container 36.

For the configuration as shown in FIGS. 1 and 2, inlet 34 may be connected to a blower, not shown, which supplies the second gas stream to the second chamber. However, the blower and second chamber 32 may be eliminated, and the first gas stream may be used to cool the particles and to convey them to container 36. In this case, the polymer, either dissolved or undissolved in liquid, or the polymer melt, cools and solidifies on the particle in the atmosphere between the zone of turbulence and the collection container, and the coated particles fall into collection container 36.

It is preferable that the axial length of the zone of turbulence is about ten times the diameter of the second chamber. This allows the pressure at the outlet of the flow restrictor to be at a minimum. Solid particles are fed into second chamber 32 as shown in FIGS. 1 and 2 near the outlet of the flow restrictor, which is preferably positioned at the center line of the hopper. If the pressure at the outlet is too great, the solid particles will back flow into the hopper.

The pressure of the second gas stream must be sufficient to assist in conveying the coated solid particles from the zone of turbulence to the collection zone, but should be lower than the pressure of the first gas stream. This is because a high relative velocity difference between the first gas stream and the second gas stream produces a sufficient degree of turbulence to coat the solid particles.

Further in accordance with the present invention, there is provided a process for coating a polyvalent carboxylic acid solid particle with a polymer. It should be noted that the process of the present invention may be practiced using the apparatus illustrated in FIGS. 1 and 2, although it should be understood that the process of the present invention is not limited to the illustrated apparatus. The process comprises the steps of metering a liquid comprising a polymer into a flow restrictor, such as flow restrictor 14 as shown in FIGS. 1 and 2. As described above for the apparatus, if a solution is used, the polymer is dissolved in the liquid, or if a slurry is used, the polymer is undissolved in the liquid. If a melt is used, the liquid comprises the polymer melt.

The process of the present invention further comprises injecting a gas stream, for instance from a gas inlet line such as that shown at 22 in FIGS. 1 and 2, through the flow restrictor concurrently with metering the liquid comprising the polymer into the flow restrictor, to create a zone of turbulence at the outlet of the flow restrictor. The shear in the zone of turbulence atomizes the liquid.

The gas stream is heated prior to injecting it through the flow restrictor. The gas stream may be heated by a heater, such as heater 24 as shown in FIG. 1. As noted above for the apparatus, when the coating material is either dissolved or undissolved in a liquid, the gas stream is heated to a temperature sufficient to vaporize the liquid and to leave the solid, either dissolved or undissolved, remaining. When a polymer melt is used, the gas stream should be heated to a temperature at or above the melt temperature of the melt, to keep the polymer melt in liquid form. As also noted above for the apparatus, when using a melt, it is also helpful if auxiliary heat is provided to the first inlet line which supplies the melt prior to injection, to prevent pluggage of the line.

The process of the present invention also comprises the step of adding a solid particle to the zone of turbulence concurrently with the metering of the liquid comprising the polymer and the injection of the gas stream. This mixes the solid particle with the atomized liquid at the zone of turbulence. This mixing at the zone of turbulence coats the solid particle with the polymer. The solid is preferably metered in order to control the ratio of the solid and the liquid added at the zone of turbulence. This establishes the level of coating on the solid particle. When a solution or slurry is used, the heat from the heated gas stream serves to evaporate the liquid, leaving the solid polymer remaining to coat the particle. The mixing at the zone of turbulence then coats the solid particle with the remaining polymer from the solution or slurry. When a polymer melt is used, the mixing at the zone of turbulence coats the solid particle with the melt.

As noted above, the zone of turbulence is formed by the action of injecting the gas at high pressure through the flow restrictor. As discussed above with respect to the apparatus, it is preferable that the gas stream is accelerated to at least about one-half the velocity of sound prior to injection to ensure that a zone of turbulence of sufficient intensity will be formed at the outlet of the flow restrictor.

The residence time of the particles in the zone of turbulence is determined by the geometry of the first chamber and the amount of gas injected from the gas inlet line. The average residence time of the solid particles within the zone of turbulence is preferably less than 250 milli-seconds. More preferably, the average residence time of the solid particle within the zone of turbulence is in the range of 25 to 250 milli-seconds. Short residence times can be achieved because of the action of the zone of turbulence. The short residence times make the process of the present invention advantageous compared to conventional coating processes because the time, and hence, the cost of coating particles, are reduced.

Typically, the solid particles are fed from a hopper, such as hopper 28 as shown in FIGS. 1 and 2, which is open to the atmosphere. As noted above for the apparatus, when a polymer melt is used, it is preferred that the solid particles be at ambient temperature because this will facilitate solidification of the melt after the melt (which is initially at a higher temperature) coats the solid particle in the zone of turbulence.

The process of the present invention may further comprise the step of adding another gas stream upstream of the zone of turbulence for cooling and conveying the coated solid particle. This other gas stream is added through a chamber, such as second chamber 32 as shown in FIGS. 1 and 2. As explained above for the apparatus, the pressure of the second gas stream must be sufficient to assist in conveying the coated solid particles from the zone of turbulence to the collection container, but should be at lower than the pressure of the first gas stream in order to achieve coating. When a solution or slurry is used, the polymer of the solution or slurry cools and solidifies on the particle in the second chamber between the zone of turbulence and a collection container, such as collection zone 36 as described above. When a melt is used, the melt cools and solidifies on the particle in the second chamber between the zone of turbulence and the collection container. When a second chamber is not included, the solid polymer of the solution or slurry or the polymer melt cools and solidifies on the particle in the atmosphere between the zone of turbulence and the collection container, and the coated particles fall into the container.

The present invention will be clarified by the following Example, which is intended to be purely exemplary of the invention.

EXAMPLE 1

Dodecanedioic acid is a chemical intermediate which has a tendency to sublime at elevated temperatures. In order to inhibit this sublimation, DDDA was encapsulated with a glycidyl methacrylate, or GMA, co-polymer. Specifically, this Example is directed to the encapsulation of solid particle of dodecanedioic acid (DDDA) with a GMA co-polymer of glycidyl methacrylate, butyl methacrylate, methyl methacrylate and styrene, which co-polymer is available from Anderson Development Company of Adrian, Mich. The uncoated dodecanedioic acid solid particle had a mean particle size of 23.5 micrometers ($\mu$), and the coated dodecanedioic acid had a mean particle size of 26.2 micrometers ($\mu$).

Injector technology apparatus, such as that shown in FIGS. 1 and 2, was used in order to encapsulate the DDDA with GMA co-polymer. The apparatus had a shear zone of one inch (2.54 cm.) in diameter. DDDA was dispersed using an Alpine 160z pin mill operated at 10,400 rpm to produce particles having a mean particle size of 23.5 micrometers ($\mu$). DDDA powder was metered using a screw feeder at a rate of 1300 g./min. to the hopper as shown in FIGS. 1 and 2. A solution comprising 43% by weight of the GMA co-polymer as described above, dissolved in toluene, was metered with a peristaltic pump at a rate of 242 g./min. A first gas stream of nitrogen at a pressure of 100 psig and at a temperature of 240° C. was injected through the flow restrictor. The GMA co-polymer in toluene solution coated the DDDA particles in the zone of turbulence simultaneously with the flashing of the toluene solution to the gaseous phase as it was contacted by the heated nitrogen gas stream. The mean residence time in the zone of turbulence was 150 milli-seconds.

The DDDA particles were collected and found to be substantially encapsulated by the GMA co-polymer. The particles had an average coating of 8% by weight of the GMA co-polymer, i.e., the coating was 8% of the total weight of the coated particle. Total feed of the coating material (i.e., 43% by weight of the GMA co-polymer described above, dissolved in toluene) was 18.6% based upon the weight of the DDDA.

The collected sample of coated DDDA particles was incorporated into a standard powder coating test formulation, coated onto a metal body panel, and then baked in a curing oven equipped with a collection device to measure volatiles by head space gas chromatography. The sample yielded reductions in DDDA volatiles of 80% by weight. The sample gave a cured coating with good gloss, no pitting, and good flow characteristics during curing in the bake oven.

Additional samples were prepared and tested in the manner described above. Particles encapsulated with an average coating of 11.1% by weight of the GMA co-polymer yielded a reduction in DDDA volatiles of 85%. Particles encapsulated with an average coating of 4.7% by weight of the GMA co-polymer yielded reduction in DDDA volatiles of 50%.

Additional advantages and modifications will readily occur to those skilled in the art. The invention, in its broader aspects, is therefore not limited to the specific details, representative apparatus and illustrative Example shown and described. Accordingly, departures may be made from such details without departing from the spirit or scope of the general inventive concept as defined by the appended claims and their equivalents.

What is claimed is:

1. An acid composition comprising, a polyvalent carboxylic acid solid particle coated with a coating material comprising a polymer, wherein the polyvalent carboxylic acid solid particle has the following structural formula:

[HO$_2$C]$_m$—R—[CO$_2$H]$_n$ where R is selected from the group consisting of: (a) a linear alkylene group of 7 to 12 carbon atoms, (b) a branched alkylene group of 7 to 12 carbon atoms, (c) a cyclic alkylene group of 6 to 8 carbon atoms, (d) an alkyl-substituted cyclic alkylene group of 6 to 8 carbon atoms, (e) an aromatic group, (f) an alkyl-substituted aromatic group, (g) an anhydride group having a structure —[R'—CO—O—CO—R"]$_x$, wherein R' and R" are independently selected from (a), (b), (c), (d), (e) and (f), x=2–10, and m+n=one of the following: 2, 3 or 4.

2. The acid composition of claim 1, wherein the polymer is selected from the group consisting of: polyamides, epoxy polymers, polyurethanes and glycidyl-group containing acrylic polymers produced by the co-polymerization of a glycidyl-group-containing monomer and an unsaturated ethylenic monomer.

3. The acid composition of claim 1, wherein the acid particle is a dicarboxylic acid.

4. The acid composition of claim 3, wherein the dicarboxylic acid is a branched aliphatic acid.

5. The acid composition of claim 3, wherein the dicarboxylic acid is a cycloaliphatic acid.

6. The acid composition of claim 3, wherein the dicarboxylic acid is an alkyl-substituted cycloaliphatic acid.

7. The acid composition of claim 3, wherein the dicarboxylic acid is an aromatic acid.

8. The acid composition of claim 3, wherein the dicarboxylic acid is an alkyl-substituted aromatic acid.

9. The acid composition of claim 3, wherein the dicarboxylic acid is a carboxylic-group-terminated anhydride derived from an acid selected from the group consisting of: a linear aliphatic acid, a branched aliphatic acid, a cycloaliphatic acid, an alkyl-substituted cycloaliphatic acid, an aromatic acid and an alkyl-substituted aromatic acid.

10. The acid composition of claim 3, wherein the dicarboxylic acid is a linear aliphatic acid.

11. The acid composition of claim 10, wherein the linear aliphatic dicarboxylic acid is dodecanedioic acid and the polymer is a co-polymer of glycidyl methacrylate, butyl methacrylate, methyl methacrylate and styrene.

12. The acid composition of claim 1, wherein the weight percentage of the coating material to the total weight of the solid particle ranges from about 2% to about 15%.

13. The acid composition of claim 1, wherein the mean size of the coated solid acid particle ranges from about 0.5 to about 50 micrometers.

14. A process for coating a solid polyvalent carboxylic acid solid particle with a polymer, comprising the steps of:
(a) metering a liquid comprising a polymer into a flow restrictor;
(b) injecting a gas stream through the flow restrictor concurrently with step (a) to create a zone of turbulence at the outlet of the flow restrictor, thereby atomizing the liquid;
(c) heating the gas stream prior to injecting the gas stream through the flow restrictor; and
(d) adding a polyvalent carboxylic acid solid particle to the zone of turbulence concurrently with steps (a) and (b) to mix the solid particle with the atomized liquid, wherein the mixing at the zone of turbulence coats the solid carboxylic acid particle with the polymer.

15. A coated polyvalent carboxylic acid solid particle made by the process of claim 14.

16. The coated polyvalent carboxylic acid solid particle of claim 15, wherein the mean particle size of the coated particle ranges from about 0.5 to about 50 micrometers.

17. The coated polyvalent carboxylic acid solid particle of claim 16, wherein the polyvalent carboxylic acid particle is dodecanedioic acid and the polymer is a co-polymer of glycidyl methacrylate, butyl methacrylate, methyl methacrylate and styrene.

* * * * *